UNITED STATES PATENT OFFICE.

WILLIAM B. SCHUYLER, OF SAN FRANCISCO, CALIFORNIA.

POPPED RICE AND PROCESS OF MAKING THE SAME.

1,201,510.  Specification of Letters Patent.  Patented Oct. 17, 1916.

No Drawing.  Application filed June 19, 1916. Serial No. 104,503.

*To all whom it may concern:*

Be it known that I, WILLIAM B. SCHUYLER, a citizen of the United States, residing at San Francisco, in the county of San Francisco and State of California, have invented new and useful Improvements in Popped Rice and Processes of Making the Same, of which the following is a specification.

The present invention has for its object to provide a process of popping and preparing rice and the invention consists of said process and of the popped rice produced thereby.

The process is as follows:—I place paddy rice in a closed vessel, and, while agitating the rice, preferably by revolving the vessel, I steam the rice by injecting into the vessel steam at about 50 pounds pressure. This steaming process being continued for from eight to ten minutes, the bran coating of the rice, which, in its normal condition, is brittle, becomes tough and strong. Next, without being exposed to the outside atmosphere or to any cooling influence, the rice with the hull thereon is transferred to another vessel in which it is heated to a high temperature. The great heat tends to expand the rice, but this expansion is prevented by its inclosure within the bran coating, and the utility of the treatment by steam is now apparent, for said bran coating has been toughened and strengthened to such a degree that the expansive effect of the heat is resisted by the coating so long that, when the expansive effect of the heat overcomes the resistance of the coating, the expansion takes place violently; in other words, the rice pops. The heat must, however, be applied in a special manner. If the grains of rice were put in an oven, they would simply roast and would not pop at all, and if they were exposed to a flame, while they would pop, they would also burn and be discolored. To avoid this result the rice is heated by applying external heat to the vessel in which it has been transferred as aforesaid, and the vessel is revolved so as to agitate the rice therein. At the same time a current of air is caused to pass continuously through the vessel from one end to the other, which current carries off the vapors which are given off from the rice while it is being heated.

My process is preferably used in a continuous manner, fresh grains being supplied while popped rice is removed.

Finally, I separate the hull from the ruptured bran coating and the rice adhering thereto. By this process the whole of the strength of the rice is left in the finished product. In the preparation of rice in this country it is generally customary to remove the bran coating, and leave the rice in a white condition. The bran coating, however, contains the most valuable ingredients of the rice.

The product can be used in the same way as pop corn, or it can be used as a breakfast food.

I claim:—

1. The method of preparing rice which consists in steaming the rice with the bran coating thereon, and then heating the same with a dry heat.

2. The method of preparing rice which consists in steaming the rice with the bran coating and the hull thereon, then heating the same with a dry heat, and then removing the hull.

3. The method of preparing rice which consists in steaming and agitating the rice with the bran coating thereon and then heating the same with a dry heat.

4. The method of preparing rice which consists in steaming and agitating the rice with the bran coating and hull thereon, then heating the same with a dry heat, and then removing the hull.

5. The method of preparing rice which consists in steaming and agitating the rice with the bran coating thereon, then heating the same with a dry heat, and causing air to pass in contact with the rice while heating.

6. The method of preparing rice which consists in steaming and agitating the rice with the bran coating and hull thereon, then heating the same with a dry heat, then removing the hull, and causing air to pass in contact with the rice while heating.

7. A rice product consisting of the ruptured bran coating and the particles of rice adhering to the coating but greatly expanded.

WM. B. SCHUYLER.